United States Patent
Kavala

(10) Patent No.: US 7,866,951 B2
(45) Date of Patent: Jan. 11, 2011

(54) WIND TURBINE BLADES WITH CROSS WEBS

(75) Inventor: Venkateswara Rao Kavala, Andhra Pradesh (IN)

(73) Assignee: General Electric Company, Schenectady, NY (US)

(*) Notice: Subject to any disclaimer, the term of this patent is extended or adjusted under 35 U.S.C. 154(b) by 265 days.

(21) Appl. No.: 12/200,955

(22) Filed: Aug. 29, 2008

(65) Prior Publication Data

US 2010/0054950 A1 Mar. 4, 2010

(51) Int. Cl.
F03D 11/00 (2006.01)
(52) U.S. Cl. .................................. 416/226; 416/232
(58) Field of Classification Search ............... 416/232, 416/233, 239, 226
See application file for complete search history.

(56) References Cited

U.S. PATENT DOCUMENTS

| | | | | | |
|---|---|---|---|---|---|
| 2,326,430 | A | * | 8/1943 | Blanchard | 269/254 R |
| 3,333,642 | A | * | 8/1967 | Kee | 416/226 |
| 4,295,790 | A | * | 10/1981 | Eggert, Jr. | 416/226 |
| 5,129,787 | A | * | 7/1992 | Violette et al. | 416/226 |
| 5,476,704 | A | | 12/1995 | Kohler | |
| 7,179,059 | B2 | * | 2/2007 | Sorensen et al. | 416/226 |
| 7,198,471 | B2 | | 4/2007 | Gunneskov et al. | |

* cited by examiner

Primary Examiner—Ninh H Nguyen
(74) Attorney, Agent, or Firm—William F. Heinze; Ernest G. Cusick; Frank A. Landgraff

(57) ABSTRACT

A blade for a wind turbine includes a spar having a shear web, and at least one cross web extending from the spar.

19 Claims, 3 Drawing Sheets

WIND TURBINE BLADES WITH CROSS WEBS

BACKGROUND OF THE INVENTION

1. Technical Field

The subject matter described here generally relates to fluid reaction surfaces with specific blade structures that are formed with a main spar, and, more particularly, to wind turbine blades having cross webs.

2. Related Art

A wind turbine is a machine for converting the kinetic energy in wind into mechanical energy. If the mechanical energy is used directly by the machinery, such as to pump water or to grind wheat then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

The blades 10 generate lift and capture momentum from moving air that is them imparted to a rotor as the blades spin in the "rotor plane." Each blade is typically secured at its "root" end, and then "spans" radially "outboard" to a free, "tip" end. The distance from the tip to the root, at the opposite end of the blade, is called the "span." The front, or "leading edge," of the blade connects the forward-most points of the blade that first contact the air. The rear, or "trailing edge," of the blade is where airflow that has been separated by the leading edge rejoins after passing over the suction and pressure surfaces of the blade.

A "chord line" connects the leading and trailing edges of the blade in the direction of the typical airflow across the blade. The length of the chord line is simply called "the chord." Since many blades 10 change their chord over the span, the chord length is referred to as the "root chord," near the root, and the "tip chord," near the tip of the blade. The chord lines are arranged in the "chord planes" that extend through the streamlines on the corresponding pressure and suction surfaces of the blade. Multiple "shear web planes" are arranged perpendicular to the to the chord plane.

As illustrated in FIG. 2, the blades 10 for such wind turbines 2 are typically fabricated by securing various "shell" portions 20 to one or more "spar" members 22 such as with a bonding material 24. The spar members 22 extend at least partially spanwise along the inside of the blade 10 and are typically configured as I-shaped beams having a web referred to as a "shear web" 26 that typically extends between two flanges, referred to as "caps" or "spar caps" 28. For example, the spar caps 28 may be joined to the inside of the suction and pressure surfaces of the shell 20 or they may form part of the shell. However, the shear web 26 may also be utilized without caps and the various components of the shell 20 and/or spar 22 may be integrally formed without bonding materials 24. Other configurations may also be used for the spar 22 including, but not limited to "C-," "L-," "T-," "X-," "K-," and/or box-shaped beams.

Spar cap buckling and torsional stability are just two of the problems associated with the design of blades 10. For example, the spar caps 28 must often be thickened, such as with additional layers of material, in order to prevent such buckling. However, this approach toward addressing the problem of spar cap buckling can significantly increase the weight of the blade 10 and does not necessarily provide significant improvements in torsional stability.

BRIEF DESCRIPTION OF THE INVENTION

These and other drawbacks associated with such conventional approaches are addressed here in by providing, in various embodiments a blade for a wind turbine including a spar having a shear web; and at least one cross web extending from the spar. Also provided is a blade for a wind turbine including a spar having a shear web; and at least one cross web having an edge connected to the shear web, extending from the shear web in a chord plane that is substantially perpendicular to the shear web.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
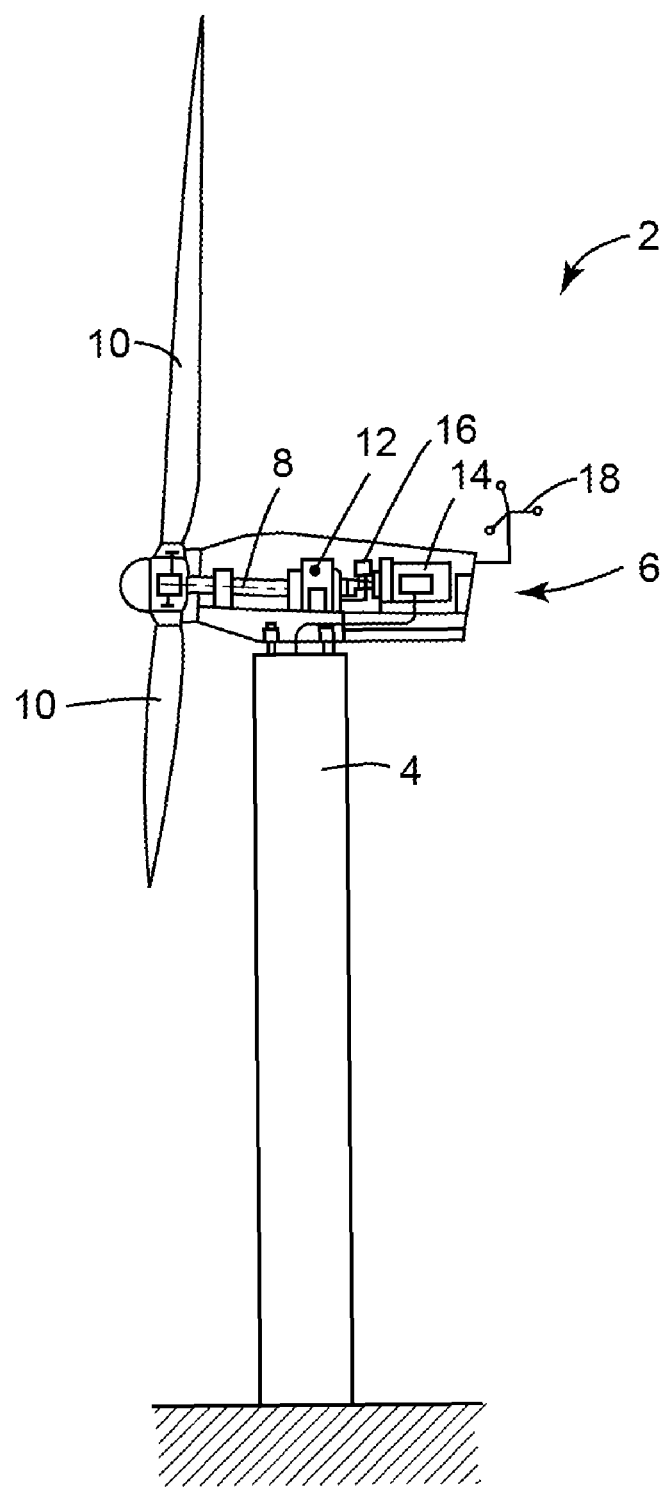
FIG. 1 is a schematic side view of a conventional wind generator.
Figure 2:
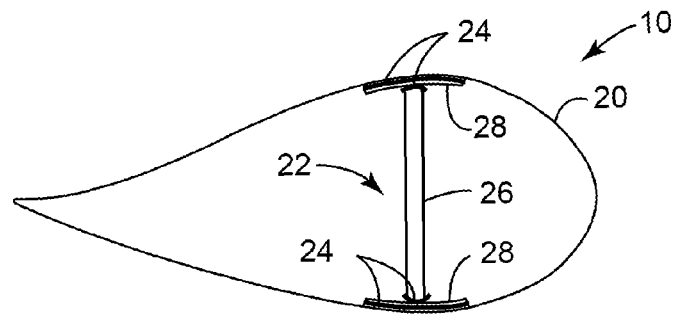
FIG. 2 is a schematic cross-sectional view of the conventional wind turbine blade in FIG. 1.
Figure 3:
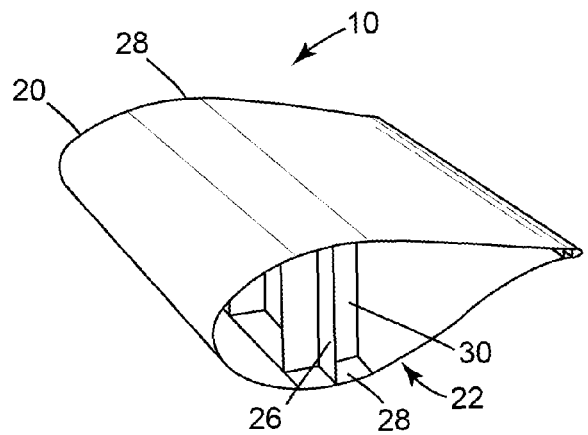
FIG. 3 is a partial orthographic view of wind turbine blade including a spar.

FIG. 3 is a partial orthographic view of wind turbine blade 10 for use with the wind turbine 2 shown in FIG. 1 and/or any other wind turbine. The blade 10 includes a spar 22 having a shear web 26 and one or more cross webs 30 extending from the spar. The cross webs 30 may be placed in any region of the blade 10 including where buckling, such as spar cap buckling, and/or excessive torsion is likely to occur. Various configurations of the cross webs 30, such as number of cross webs, lay-up configuration, placing of cross webs, and spacing between cross webs, can be implemented in order to address specific buckling margin and mode needs.

In the examples illustrated here, the cross web 30 is substantially planar, connect to the shear web 26 at one edge, and extends substantially perpendicular to the shear web 26 in a chord plane. However, the cross webs 30 may also be also be spaced from the shear web 26, curved, folded, and/or arranged at other angles from the shear web. The cross web 30 may also extend along less than the entire length of the shear web 26 and/or less than the entire width of the spar cap 28.

Figure 4:
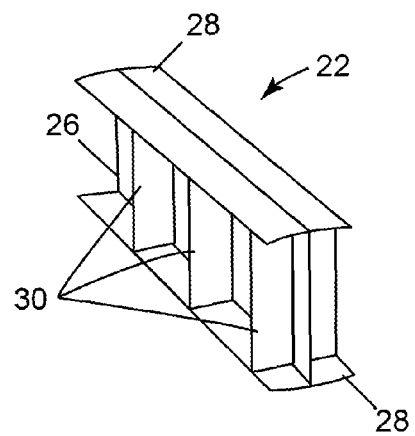
FIG. 4 is an orthographic view of the spar shown in FIG. 3.
Figure 5:
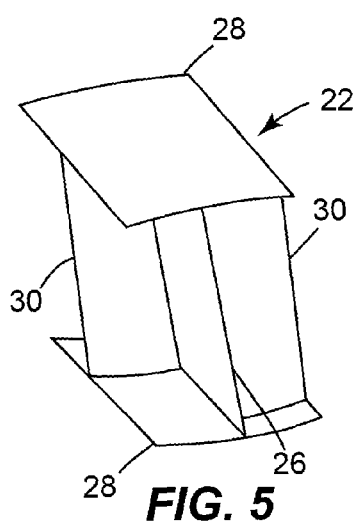
FIG. 5 is a partial orthographic view of another spar for the wind turbine blade shown in FIG. 3.

As best illustrated in FIGS. 4 and 5, two or more cross webs 30 may extending from opposite sides of the shear web 26.

For example, as shown in FIG. 4, two cross webs 30 may be arranged in substantially the same plane. As shown in FIG. 5, some or all of the cross webs 30 may also be displaced from each other along the spar 22. For example, the two cross webs may displaced from each other along the spar 22 by a range of about 50 to 1000 millimeters, a narrower range of about 250 to 750 millimeters, or an even narrower range of about 450 to 550 millimeters, or approximately 500 millimeters.

Figure 6:
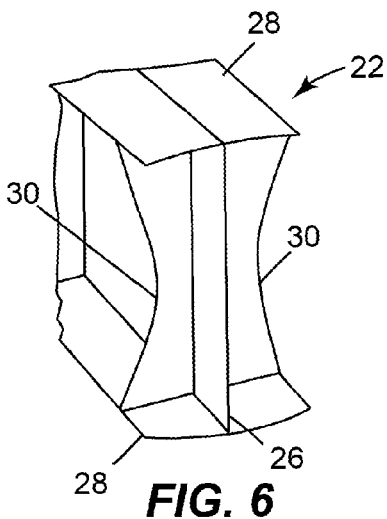
FIG. 6 is a partial orthographic view of another spar for the wind turbine blade shown in FIG. 3.

Some or all of the cross webs 30 may also have a nonlinear edge on a side of the shear web 26 that is opposite from the shear web. For example, the non-linear edge may be substantially parabolic as illustrated in FIG. 6. However, other curvature configurations may also be used, including, but not limited to any portion or combination of various types algebraic curves caustic curves, cissoids, conchoids, conic sections, elliptic curves, hyperbolic curves, general plane curves, implicit curves, inverse curves, involutes and evolutes, pedal curves, polar curves, pursuit curves, radial curves, roulettes, strophoids, rational, transcendental, fractal, continuous, discontinuous, and/or piecewise curves, other curvatures may also be used including semicircular, hyperbolic. The non-linear edge may also be U-, or V-shaped.

Figure 7:
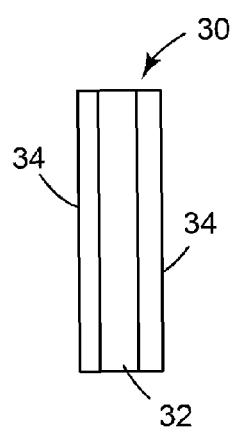
FIG. 7 is a cross-sectional view of the cross web shown in FIGS. 3-6 and 8.
Figure 8:
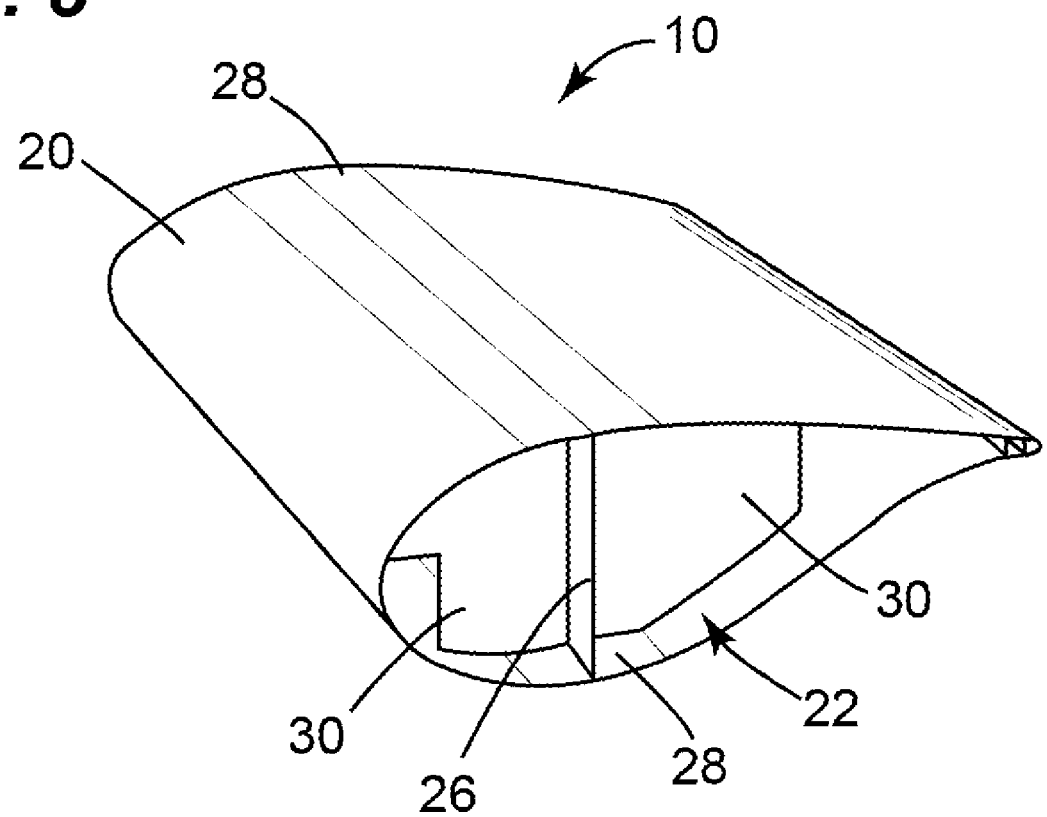
FIG. 8 is a partial orthographic view of another wind turbine blade including a spar.

As illustrated in FIG. 7, the cross web 30 maybe formed with a core 32 and skin 34. For example, the core 32 may include a low-density material such as foam or balsa wood. The skin 34 may be formed from one or more layers are resin impregnated fiber reinforcements, such as glass, carbon, aramid/kevlar, and/or any combination thereof. For example, the skin 34 layers may be formed from 45 degree biaxial structural fabric. However other materials and configurations may also be used. As illustrated in FIG. 8, the cross webs 30 on either or both sides of the spar 22 may also extend past the edge of either or both of the top and bottom spar caps 28.

The technology disclosed here offers various advantages over conventional approaches. For example, in one simulation, it increased the spar cap buckling failure margin from 1.08 in a base line case to 1.28 for a 17.5 meter radial location where the spacing between three cross webs 30 was 500 millimeters, or half the wave length of the buckling mode in the base line model. An equivalent increase in buckling factor would have required an additional seven layers of material on the spar cap 28. An efficiency factor, defined as the buckling factor increase divided by the mass increase, also increased from 0.619% to 2.41%. Reducing buckling allows larger blades 10 to be used for improved energy capture and allows the use of wider spar caps. Torsional stiffness of rotor blade 10 will increase, particularly in single shear web design where the cross web 30 extends along the entire height of the shear web 26.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A blade for a wind turbine, comprising:
   a spar having a shear web; and
   at least one cross web extending from the spar in a chord plane of the blade;
   wherein the cross web has a height that is substantially the same as a height of the shear web.

2. The blade recited in claim 1, wherein the at least one cross web extends substantially perpendicular to the shear web.

3. The blade recited in claim 1, wherein the at least one cross web comprises at least two cross webs extending from opposite sides of the shear web.

4. The blade recited in claim 3, wherein the at least two cross webs are arranged in substantially the same plane.

5. A blade for a wind turbine, comprising:
   a spar having a shear web; and
   at least one cross web extending from the spar;
   wherein the at least one cross webs comprises at least two cross webs extending from opposite sides of the shear web and the at least two cross webs are displaced from each other along the spar.

6. The blade recited in claim 5, wherein the at least two cross webs are displaced from each other along the spar by about 500 millimeters.

7. A blade for a wind turbine, comprising:
   a spar having a shear web; and
   at least one cross web extending from the spar;
   wherein the at least one cross web comprises a nonlinear edge on a side opposite from the shear web.

8. The blade recited in claim 7, wherein the nonlinear edge is substantially parabolic.

9. A blade for a wind turbine, comprising:
   a spar having a shear web;
   at least one cross web extending from the spar;
   at least one spar cap arranged on an edge of the shear web; and
   wherein the at least one cross web extends past an edge of the spar cap.

10. A blade for a wind turbine, comprising:
    a spar having a shear web; and
    at least one cross web, having an edge connected to the shear web, extending from the shear web in a chord plane that is substantially perpendicular to the shear web;
    wherein the cross web has a height that is substantially the same as a height of the shear web.

11. The blade recited in claim 10, wherein the at least one cross web comprises at least two cross webs extending from opposite sides of the shear web.

12. A blade for a wind turbine, comprising:
    a spar having a shear web;
    at least two cross webs, each having an edge connected to the shear web and extending from opposite sides of the shear web in a chord plane that is substantially perpendicular to the shear web; and
    wherein the at least two cross webs are displaced from each other along the spar.

13. The blade recited in claim 12, wherein at least one of the cross webs comprises a substantially parabolic edge on a side opposite from the shear web.

14. The blade recited in claim 13, further comprising
    at least one spar cap arranged on an edge of the shear web; and
    wherein at least one cross web extends past an edge of the spar cap.

15. The blade recited in claim 12, further comprising
    at least one spar cap arranged on an edge of the shear web; and
    wherein at least one of the cross webs extends past an edge of the spar cap.

16. A blade for a wind turbine, comprising:
    a spar having a shear web; and
    at least one cross web, having an edge connected to the shear web, extending from the shear web in a chord plane that is substantially perpendicular to the shear web;

wherein the at least one cross web comprises a substantially parabolic edge on a side opposite from the shear web.

17. A blade for a wind turbine, comprising:

a spar having a shear web;

at least two cross webs, each having an edge connected to the shear web and extending from opposite sides of the shear web in a chord plane that is substantially perpendicular to the shear web; and wherein at least one of the cross webs comprises a substantially parabolic edge on a side opposite from the shear web.

18. A blade for a wind turbine, comprising:

a spar having a shear web; and at least one cross web, having an edge connected to the shear web, extending from the shear web in a chord plane that is substantially perpendicular to the shear web;

at least one spar cap arranged on an edge of the shear web; and wherein the at least one cross web extends past an edge of the spar cap.

19. A blade for a wind turbine, comprising:

a spar having a shear web;

at least two cross webs, each having an edge connected to the shear web and extending from opposite sides of the shear web in a chord plane that is substantially perpendicular to the shear web;

at least one spar cap arranged on an edge of the shear web; and wherein at least one cross web extends past an edge of the spar cap.

* * * * *